United States Patent
Kulick, III et al.

(10) Patent No.: US 8,690,130 B2
(45) Date of Patent: Apr. 8, 2014

(54) STRUCTURED SHEET CROSS-FLOW DISTRIBUTION MEDIA

(75) Inventors: Frank M. Kulick, III, Sinking Spring, PA (US); Curtis S. McDowell, Allentown, PA (US)

(73) Assignee: Brentwood Industries, Inc., Reading, PA (US)

( * ) Notice: Subject to any disclaimer, the term of this patent is extended or adjusted under 35 U.S.C. 154(b) by 527 days.

(21) Appl. No.: 12/707,665

(22) Filed: Feb. 17, 2010

(65) Prior Publication Data

US 2014/0053926 A1 Feb. 27, 2014

Related U.S. Application Data

(60) Provisional application No. 61/155,429, filed on Feb. 25, 2009.

(51) Int. Cl.
*B01F 3/04* (2006.01)

(52) U.S. Cl.
USPC .................................. 261/112.2; 261/DIG. 72

(58) Field of Classification Search
USPC .......................... 261/109, 112.2, 123, DIG. 72
See application file for complete search history.

(56) References Cited

U.S. PATENT DOCUMENTS

| | | | | |
|---|---|---|---|---|
| 3,374,992 A | * | 3/1968 | Greer | 261/112.2 |
| 3,982,981 A | * | 9/1976 | Takao et al. | 156/89.22 |
| 4,597,916 A | * | 7/1986 | Chen | 261/94 |
| 4,668,443 A | | 5/1987 | Rye | 261/112.2 |
| 5,350,566 A | * | 9/1994 | Stringaro | 422/109 |
| 5,616,289 A | * | 4/1997 | Maeda | 261/112.2 |
| 5,722,258 A | * | 3/1998 | Aitken | 62/643 |
| 5,950,454 A | * | 9/1999 | Burst et al. | 62/643 |
| 6,089,549 A | * | 7/2000 | Ingram et al. | 261/94 |
| 6,280,819 B1 | * | 8/2001 | McKeigue et al. | 428/137 |
| 6,509,082 B1 | * | 1/2003 | McKeigue et al. | 428/137 |
| 6,544,628 B1 | | 4/2003 | Aull | 428/179 |
| 6,751,986 B2 | * | 6/2004 | Irwin et al. | 62/643 |
| 7,309,062 B2 | * | 12/2007 | Lin | 261/154 |
| 2007/0040290 A1 | * | 2/2007 | Lin | 261/154 |

* cited by examiner

*Primary Examiner* — Charles Bushey
(74) *Attorney, Agent, or Firm* — Miller Law Group, PLLC

(57) ABSTRACT

A structured sheet cross flow media is formed with a first corrugated sheet having corrugations defining flutes angled in a first direction, a second corrugated sheet defining flutes angled in a second direction, and an interstitial planar sheet disposed between the first and second corrugated sheets. The interstitial planar sheet traps the flow of fluid or gas, such as air, entering one end of the media block within opposing flutes until the end of the interstitial sheet is reached, whereupon the fluid or gas can disperse between the intersecting flutes of the first and second sheets to provide a controlled dispersal of the fluid or gas. In one embodiment, the interstitial sheet terminates at an intermediate height in the media block to define the width of dispersion of air bubbles entering at a single source point.

14 Claims, 6 Drawing Sheets

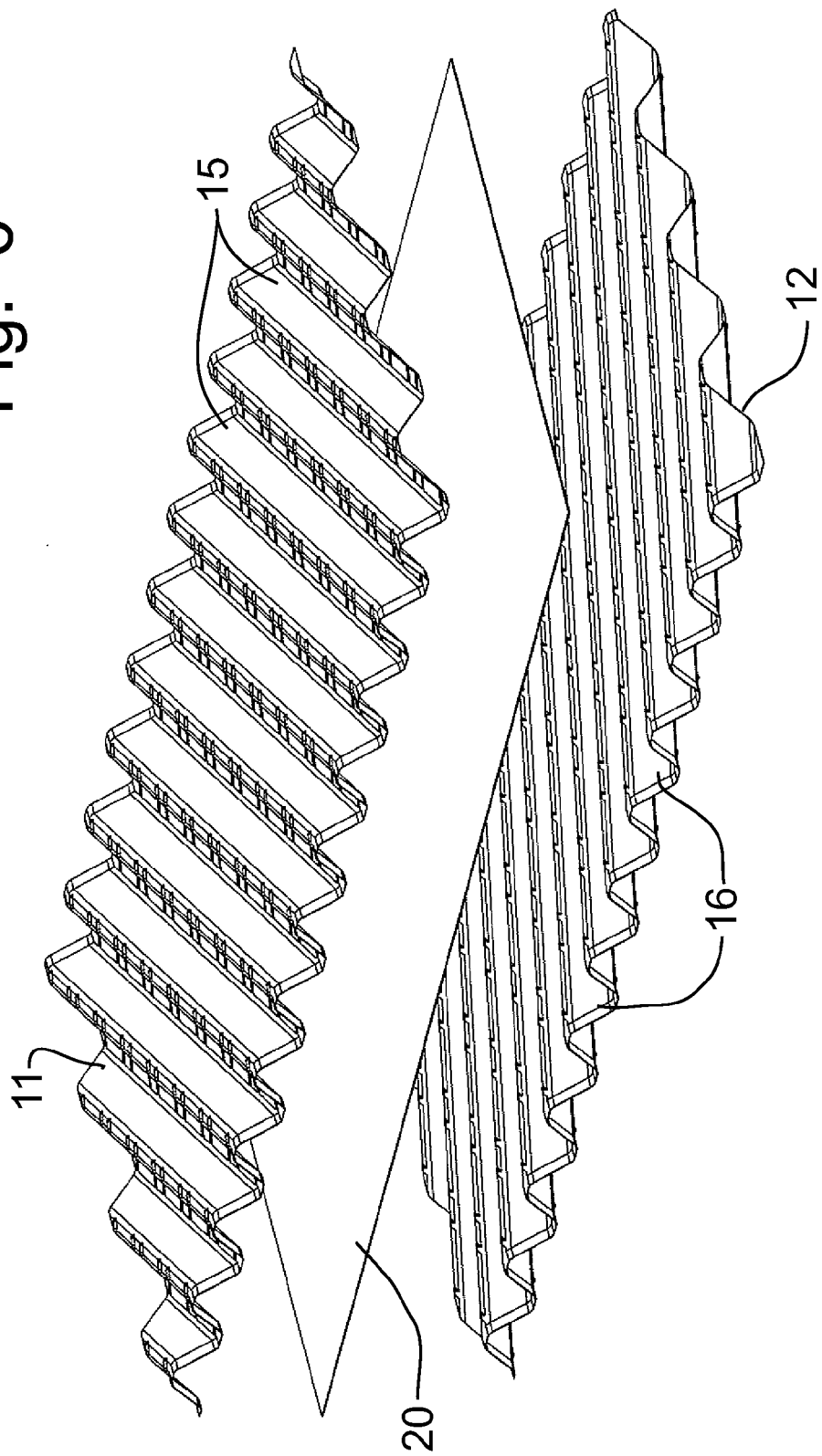

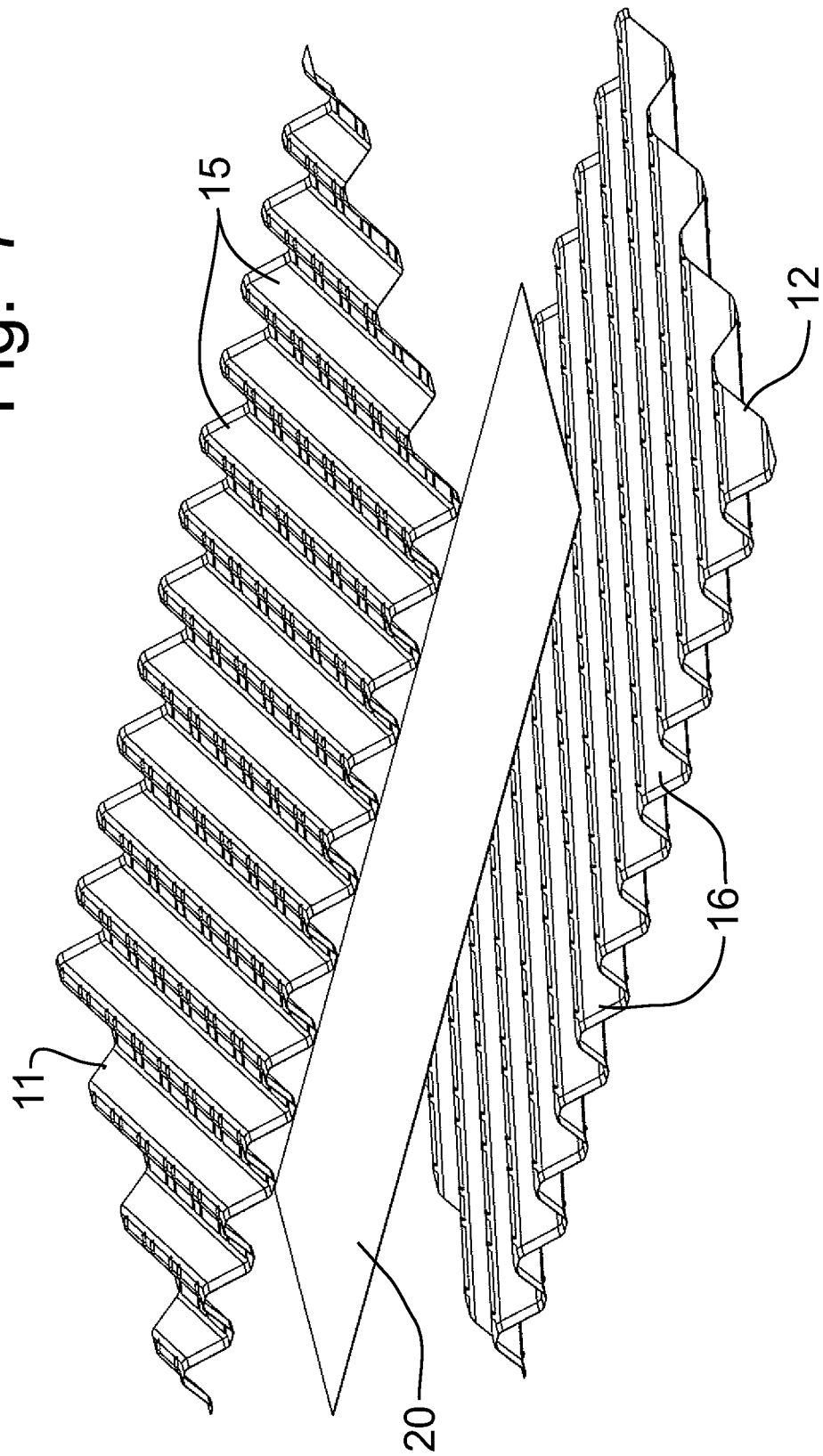

STRUCTURED SHEET CROSS-FLOW DISTRIBUTION MEDIA

CROSS-REFERENCE TO RELATED APPLICATIONS

This application claims domestic priority on U.S. Provisional Patent Application Ser. No. 61/155,429, filed on Feb. 25, 2009, the contents of which are incorporated herein by reference.

FIELD OF THE INVENTION

The present invention generally relates to cross-flow distribution media used to disperse the flow of fluids or gasses and, more particularly, to a distribution media that is configured to provide enhanced lateral distribution as the fluids or gasses pass vertically through the media.

BACKGROUND OF THE INVENTION

Fixed-film biological treatment, wherein bacteria grow as slime or attached film on fixed surfaces, over which, or through which, the wastewater is circulated, has been a method of biological treatment for many years. For example, trickling filter wastewater treatment plants use fixed biological films, which were developed in the late 1800's using rock for the fixed surfaces. Fixed biological films are used routinely for cost effective treatment of both industrial and municipal wastewater streams.

The placement of fixed surfaces in trickling filters has involved the application of "structured sheet media" which is more efficient than the large rocks originally used in trickling filters. Structured sheet media is comprised of thin corrugated plastic sheets (PVC, polypropylene or other plastics) which are fastened together to form sizable blocks, which are typically one to two feet high, about two feet wide and about four feet long, with large surface areas that can be stacked in towers. Wastewater is trickled from the top of the tower of structured sheet media down through the media providing sustenance for the bacteria to grow. Air can also move vertically through the structured sheet media stack, since the stack is typically 95% void volume between the thin plastic formed sheets. The movement of air through the media provides an aerobic biological environment for treatment of the wastewater.

The same structured sheet media is also used when submerged in wastewater, commonly referred to as submerged fixed film (SFF), to accumulate, support and retain bacteria that can affect wastewater treatment in both aerated and un-aerated wastewater environments. The structured sheet media can also aid in the distribution of diffused air injected under the media.

An introduction of activated sludge wastewater treatment technology and submerged fixed-film biological treatment of wastewater has recently emerged in the wastewater treatment industry. The combination of these two technologies has given engineers a method of increasing the capacity of existing wastewater treatment plants for total nitrogen removal or for shrinking the foot print of new biological treatment systems. The integration has been named the IFAS process, IFAS being an acronym for Integrated Fixed-Film Activated Sludge.

Formed plastic structured sheet media is disclosed in U.S. Pat. No. 4,668,443, granted to Palle Rye on May 26, 1987, wherein the formed plastic sheets are arranged to form alternating apices in the parallel and generally vertical sheets. In U.S. Pat. No. 6,544,628, issued on Apr. 8, 2003, to Richard Aull, et al, the corrugated sheets, designed for cooling tower applications, are formed with projections that allow adjacent formed sheets to be coupled together, with the projections being inserted into a corresponding depression on the adjacent sheet and crimped to hold the two sheets together.

It would be desirable to improve the distribution of water in a trickling filter application where water is dispersed above the media and distributed throughout, but particularly laterally with respect to the orientation of the media, as the water moves down the media block. It would also be desirable to improve air distribution in submerged applications as the air rises through the media to enhance an air-lift pumping action and improve oxygen transfer efficiencies. It would be desirable to improve the air and/or water distribution through various applications, including trickling filter applications, submerged fixed film applications, integrated fixed film activated sludge applications, and cooling tower applications.

SUMMARY OF THE INVENTION

It is an object of this invention to overcome the disadvantages of the prior art by providing a cross-flow media that will enhance the lateral distribution of fluids or gases vertically through a media block utilized in trickling filter applications, submerged fixed film applications, integrated fixed film activated sludge applications, and cooling tower applications.

It is a feature of this invention that a media block is formed from two corrugated plastic film members having a flat sheet member disposed therebetween.

It is another feature of this invention that the two corrugated plastic film sheets have oppositely oriented ribs defining flutes extending diagonally across the respective sheet.

It is still another feature of this invention that the flat sheet member only extends part of the distance along the width of the corrugated sheets.

It is another object of this invention to provide a cross flow media block that will create a wide dispersal of fluid or gas from a single input point.

It is yet another feature of this invention that the fluid or gas is trapped in a pair of diagonally extending, oppositely oriented flutes on opposing sides of a flat sheet member to divide the single input stream into two laterally spaced streams extending up to the height of the flat sheet member.

It is a further feature of this invention that the opposing, diagonally intersecting flutes of the opposing corrugated sheets above the height of the flat sheet member affect a dispersal of the two laterally spaced streams, thus enhancing the lateral dispersion of the fluid or gas.

It is still another feature of this invention that the extent of the dispersal of the fluid or gas can be controlled by the height of the flat sheet member relative to the overall height of the media block.

It is another object of this invention to create a media block from alternating corrugated sheets and flat sheet members, with alternating corrugated sheets having oppositely extending diagonal flutes so that a single input of fluid or gas along a centrally located longitudinally extending line under the media block will be dispersed across the transverse width of the media block.

It is an advantage of this invention that the improved distribution of wastewater through the media block would enhance mixing in trickling filter applications, submerged fixed film applications, integrated fixed film activated sludge applications, and cooling tower applications.

It is another advantage of this invention that the improved distribution of wastewater through the media block would improve oxygen transfer in trickling filter applications, submerged fixed film applications, and integrated fixed film activated sludge applications.

It is still another advantage of this invention that the improved distribution of wastewater through the media block would improve wetting and contact with the available biomass in trickling filter applications, submerged fixed film applications, integrated fixed film activated sludge applications.

It is yet another advantage of this invention that the improved distribution of wastewater through the media block would improve the removal rates of BOD and ammonia in trickling filter applications, submerged fixed film applications, integrated fixed film activated sludge applications.

It is still another advantage of this invention that the improved distribution of air through the media block will enhance air lift pumping action and mixing through the media block in submerged fixed film applications and in integrated fixed film activated sludge applications.

It is a further advantage of this invention that the improved distribution of air through the media block will improve the contact of raw wastewater with the biomass on the media in submerged fixed film applications and in integrated fixed film activated sludge applications.

It is still a further advantage of this invention that the improved distribution of air through the media block will improve media scouring in submerged fixed film applications and in integrated fixed film activated sludge applications.

It is a further advantage of this invention that the improved distribution of air through the media block will improve oxygen transfer efficiency within the basin and improve the removal rates of BOD and ammonia in submerged fixed film applications and in integrated fixed film activated sludge applications.

It is a further advantage of this invention to enable the use of a mixed media configuration with both cross flow distribution and vertical flow media in combination, where the vertical flow media offers a high surface area media as much as twice that of cross flow media and is a viable option as scouring of the vertical flow media is enabled and reduced head loss of vertical flow media further improves contact, mixing, and recirculation.

It is yet another object of this invention to provide a cross flow media block which is durable in construction, inexpensive of manufacture, carefree of maintenance, facile in assemblage, and simple and effective in use.

These and other objects, features and advantages are accomplished according to the instant invention by providing a structured sheet cross flow media having a first corrugated sheet having corrugations defining flutes angled in a first direction, a second corrugated sheet defining flutes angled in a second direction, and an interstitial planar sheet disposed between the first and second corrugated sheets. The interstitial planar sheet traps the flow of fluid or gas, such as air, entering one end of the media block within opposing flutes until the end of the interstitial sheet is reached, whereupon the fluid or gas can disperse between the intersecting flutes of the first and second sheets to provide a controlled dispersal of the fluid or gas. In one embodiment, the interstitial sheet terminates at an intermediate height in the media block to define the width of dispersion of air bubbles entering at a single source point.

BRIEF DESCRIPTION OF THE DRAWINGS

The advantages of this invention will be apparent upon consideration of the following detailed disclosure of the invention, especially when taken in conjunction with the accompanying drawings wherein:

FIG. 6 is an exploded perspective view of a portion of the first embodiment of the cross-flow media incorporating the principles of the instant invention; and FIG. 7 is an exploded perspective view of a portion of the second embodiment of the cross-flow media depicted in FIG. 4.

DETAILED DESCRIPTION OF THE INVENTION

Figure 1:
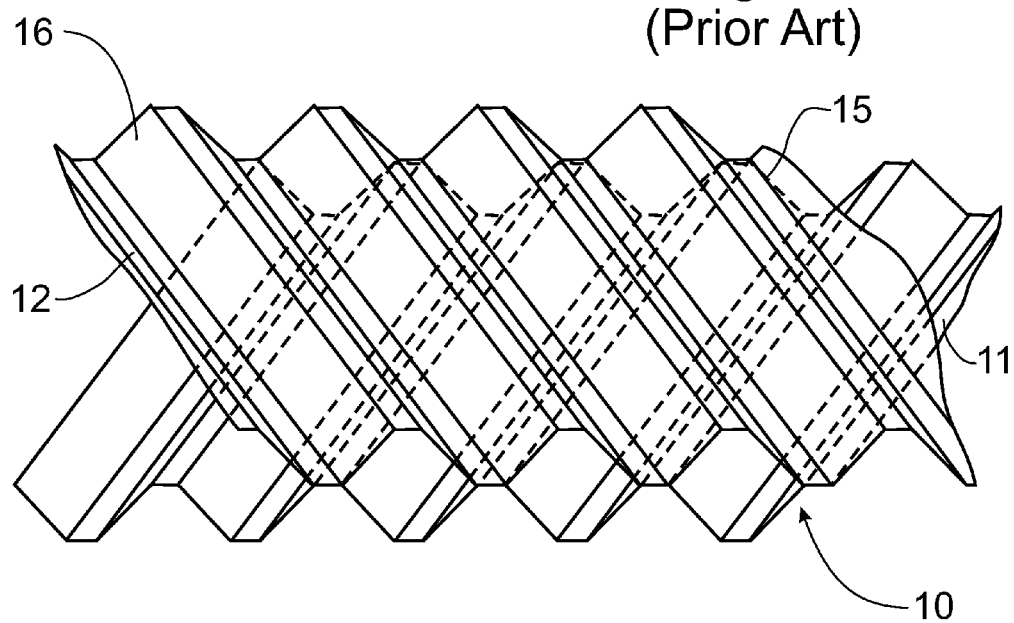
FIG. 1 is a schematic partial elevational view of a prior art cross-flow media having an opposing fluted pattern with respect to adjacent sheets.

Referring now to the drawings, a cross-flow media incorporating the principles of the instant invention can best be seen. This cross-flow media can be used in both trickling filter and cooling tower applications; therefore, this description of the invention is written in the context of the media being used in an integrated fixed film activated sludge application or a submerged fixed film application. In trickling filter and cooling tower applications of cross-flow media, an even distribution of water through the media is extremely important to the efficiency of the application. In such applications, a less efficient distribution approach (i.e. coarse nozzle system) can be used while maintaining or improving the performance of the media for its intended use. Generally, a less efficient distribution into the media is less costly, is more robust and requires less maintenance.

Conventional cross-flow media, as is reflected in FIG. 1 with sequential formed sheets 11, 12 being arranged such that the corrugations 15, 16 are oppositely directed, provides a certain amount of distribution of rising air bubbles through wastewater. The air plume necks as the more dense water surrounding the plume encroaches on the less dense water filled with air bubbles rising upwardly. The air bubbles act to reduce the density of the water within the plume, causing air upward flow of the water, which is typically referred to as air lift pumping. This less dense plume is usually contained within a pipe and the resultant pumping action is more positive because the differential pressure around the plume of less dense water is greater due to the imposition of the pipe wall between the plume and the more dense water. Without the physical separation provided by the pipe wall, the constriction or necking of the plume of less dense water by the surrounding more dense water acts to coalesce the air bubbles and allows for a greater difference in the rise velocity of the air and the water. The conventional cross-flow media has an effect of distributing and breaking up the air bubbles, but as the air and water rise through normal cross flow media, necking can occur laterally across the width of the media and discrete patterns corresponding to the location of the air diffusers become apparent.

The cross-flow media according to the instant invention, as is shown in FIGS. 2-7, modifies the conventional cross-flow media to provide a discrete path for combined fluid and air flow. The sequential formed sheets 11, 12 are provided with an interstitial sheet 20 that is preferably flat, but can be thermoformed to have structural features. The addition of the interstitial sheet 20 forms discrete tubes within the media block 10, formed from multiple layers of formed sheets 11, 12 and interstitial sheets 20, that originate from a single location and carry air and liquid away from the point of origin to some laterally spaced location due to the diagonally oriented corrugations in the formed sheets 11, 12 adjacent the interstitial sheet 20. For a single point of origin that is located at an interstitial sheet 20, the air and/or liquid is divided by the interstitial sheet 20 and directed in opposite lateral directions equidistantly due to the oppositely angled corrugations on the formed sheets 11, 12 on the opposite sides of the interstitial sheet 20, as is indicated by the arrows 22, 23 in FIG. 2.

When either the interstitial sheet 20 ends, or at the end of the media block 10 if the interstitial sheet 20 extends the full height of the formed sheets 11, 12, the air or liquid directed laterally from the point of origin at the bottom of the media block 10 will rise therefrom in a near vertical pattern through the remaining portion of the media block 10, or through the bulk phase of the aeration basin (not shown). Accordingly, a single aeration diffuser can supply a near point source of air that is distributed in a discrete, positive path by the structured sheet media block 10. The amount of lateral separation of the respective discharge points from the termination of the interstitial sheet 20 will depend on the height of the interstitial sheet 20 relative to the formed sheets 11, 12 within the media block 10, and the flute angle of the corrugations 15, 16 in the formed sheets 11, 12.

Figure 2:
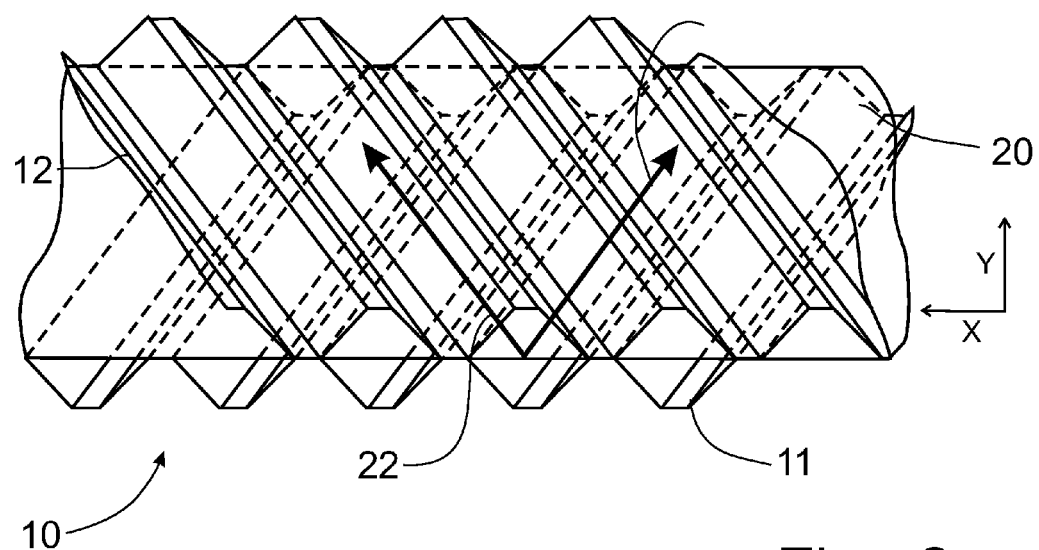
FIG. 2 is a schematic partial elevational view of the cross-flow media incorporating the principles of the instant invention.
Figure 3:
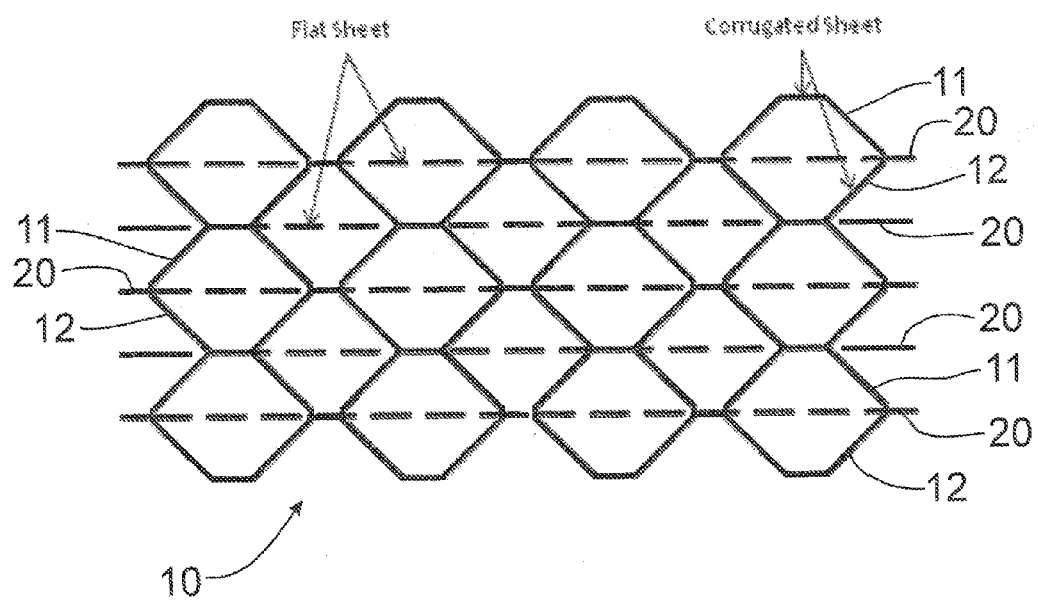
FIG. 3 is a schematic end view of a media block formed according to the principles of the instant invention.

One embodiment of the instant invention is depicted in FIGS. 2 and 6 provides for a full size interstitial sheet 20 contemporaneous with the formed sheets 11, 12 such that the interstitial sheet 20 extends from the bottom of the media block 10 to the top of the media block 10. A second embodiment of the instant invention is depicted in FIGS. 4, 5 and 7 and provides for the interstitial sheet 20 to be shorter than the formed sheets 11, 12 so that the partial interstitial sheet 20 extends from the bottom of the media block 10 to some intermediate point within the media block 10 where the partial interstitial sheet 20 terminates.

Figure 4:
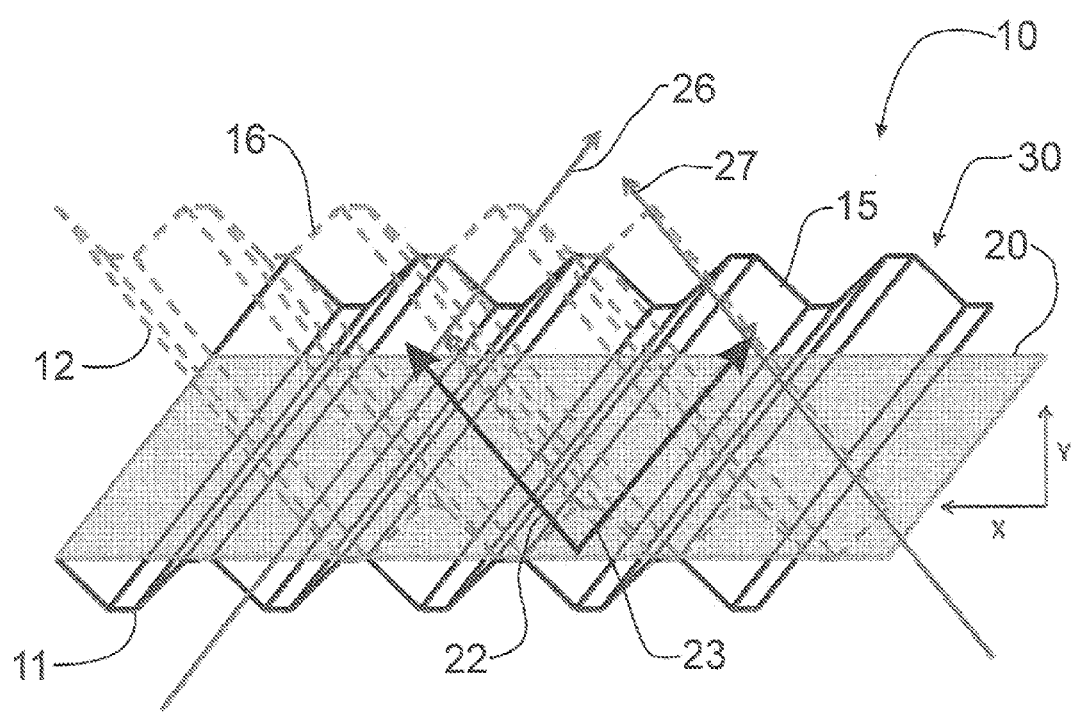
FIG. 4 is a schematic partial elevational view of the cross-flow media depicted in FIG. 2, but including a representation of fluid flow lines through the media.

FIG. 4 demonstrates the effect of the partial interstitial sheet 20 in the air lift pumping action. Even though the air is not placed in every available individual split flute defined by the corrugations 15, 16, the air lift pumping action in the standard section 30 of the media block 10 provides suction and induces flow in these areas that mix with the air stream and other aerated wastewater, as indicated by the arrows 26, 27.

The distribution process can be repeated throughout a media block formed by a plurality of media blocks 10 assembled with additional layers of the distribution media, providing constant redistribution and mixing of air and wastewater. The distribution process can also be used with vertical flow media (not shown). The advantage of the vertical flow media arrangement is that the vertical flutes provide discrete flow paths for the air lift pumping action as is conventionally attained through a pipe. The flutes in the vertical flow media prevent necking and coalescing of the air bubbles and maintains a high rate of air lift and shear to provide thin viable biomass for biological treatment.

Figure 5:
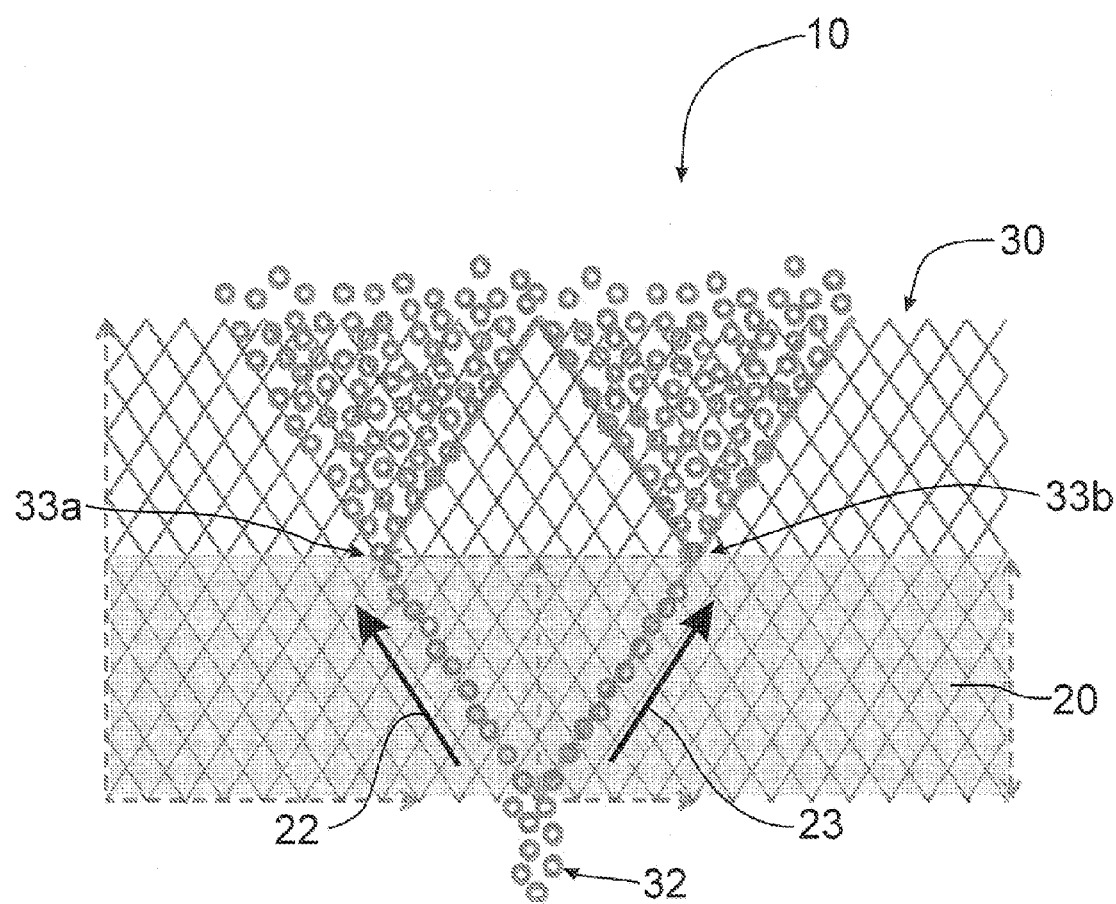
FIG. 5 is a schematic elevational view of a second embodiment of the cross-flow media to reflect air flow therethrough to attain an enhanced lateral distribution of air through the media.

Referring now to FIG. 5, the single input source 32 for air into the bottom of the media block 10 is distributed laterally in opposite directions corresponding to the arrows 22, 23, as described above. At the termination of the partial interstitial sheet 20, the discharge flow 33a, 33b of the air is substantially vertical into the standard section 30 of the media block 10 where the air is dispersed laterally in known patterns.

Additional benefits are realized as the interstitial sheets 20 provide added surface area for biological treatment. The media blocks 10 can be stacked on top of one another in a crossing pattern to distribute air and liquid in both the "X" and "Z" directions. As a result, disk diffusers can be utilized in the application instead of requiring tubular diffusers for distribution in one direction across the media block 10. Also the increased number of sheets provided by the interstitial sheets 20 aids in increasing the structural strength of the edge support with respect to rollover.

The cross-flow media is preferably assembled with the corrugated sheets 11, 12 glued to the interstitial sheets 20 in an alternating diagonal configuration, as is depicted in FIGS. 6 and 7, to establish discrete flow paths to direct the flow of either air or water both vertically and horizontally to affect a lateral displacement of the flow. Thus, a single point source of air or water is distributed to at least two laterally spaced points of discharge. The distance for such lateral displacement is a function of the height of the interstitial sheet 20 and the angle at which the corrugations are formed in the formed sheets 11, 12. The corrugated sheets 11, 12 are preferably created through the process of thermoforming plastic sheets. The interstitial sheets 20 can either be simple flat plastic sheets or formed with some structure through the thermoforming process.

The media block 10 can be formed with the interstitial sheet 20 extending the full height of the formed sheets 11, 12, and thus the full height of the media block 10, or with the interstitial sheet 20 smaller than the formed sheets 11, 12, so that the interstitial sheet 20 terminates at an intermediate position within the media block 10. Furthermore, while the drawings depict the preferred embodiment of the interstitial sheet 20 as being oriented substantially flush with the bottom surface of the media block 10, the interstitial sheet 20 can actually terminate at a lower edge that is spaced above the bottom surface of the media block 10.

When the media block 10 is configured to distribute water in an open air environment, the interstitial sheet 20 is positioned beginning at the top of the media pack 10 to maximize media efficiency in wetting the surface area for the intended application as the water flows downwardly through the media pack 10. While such a configuration of the media block 10 is not necessary for proper distribution, the configuration does not inhibit the functionality of the media pack. Water is distributed laterally horizontally more so within the discrete paths established by the insertion of the interstitial sheets 20.

When configured to distribute air in a submerged environment, the interstitial sheet 20 is positioned beginning at the bottom of the media pack 10 to maximize the distribution of air near the bottom of the media block 10, as described above, thereby optimizing the performance of the media for bubble distribution.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A structured cross flow media block for dispersal of a single point flow input of a flowable material into one end of said structured cross flow media block, comprising:

a first corrugated sheet formed with a plurality of first flutes extending at a first orientation to a vertical alignment;

a second corrugated sheet formed with a plurality of second flutes extending at a second orientation to a vertical alignment, said second orientation being different from said first orientation; and a planar interstitial sheet disposed between said first and second corrugated sheets only at said one end thereof corresponding to said single point flow input so that said first flutes do not intersect with said second flutes along said planar interstitial sheet, said interstitial sheet having a height dimension less than a corresponding height dimension of said first and second corrugated sheets so that said first and second flutes intersect after a termination of said planar interstitial sheet to provide dispersion of said flowable material, said first and second corrugated sheets being devoid of structure therebetween above said planar interstitial sheet.

2. The structural cross flow media block of claim 1 wherein said media block includes a bottom surface and a top surface, each of said first and second corrugated sheets and said planar interstitial sheet terminating along an upper edge spaced above said bottom surface, said planar interstitial sheet including a lower edge spaced above said bottom surface.

3. The structural cross flow media block of claim 1 wherein said media block includes a bottom surface and a top surface, said first and second corrugated sheets and said planar interstitial sheet having a common terminus edge along said bottom surface, said planar interstitial sheet terminating along an upper edge spaced below said top surface.

4. The structural cross flow media block of claim 1 wherein said planar interstitial sheet traps a gas in the first and second flutes corresponding to a single point of input of said gas into said media block until said gas passes said upper edge of said interstitial sheet, said gas dispersing into intersecting first and second flutes above said upper edge of said interstitial sheet.

5. The structural cross flow media block of claim 1 wherein said tower is constructed of a plurality of first corrugated sheets and a corresponding plurality of second corrugated sheets, each pair of said corrugated sheets having one of said planar interstitial sheets positioned between said corrugated sheets.

6. The structural cross flow media block of claim 5 wherein all of said planar interstitial sheets have a common height dimension smaller than the corresponding height dimension of said first and second corrugated sheets adjacent said planar interstitial sheet.

7. In a structured cross flow media block for dispersal of a single point flow input of a flowable material into one end of said structured cross flow media block and having a first corrugated sheet formed with first flutes extending at a first orientation to a vertical alignment; a second corrugated sheet formed with second flutes extending at a second orientation to a vertical alignment, said second orientation being different from said first orientation, the improvement comprising:

a planar interstitial sheet disposed between said first and second corrugated sheets at one end thereof corresponding to said single point flow input so that said first flutes do not intersect with said second flutes along said planar interstitial sheet, said planar interstitial sheet having a height dimension smaller than a corresponding height dimension of said first and second corrugated sheets so that said first and second flutes intersect after the termination of said planar interstitial sheet, said first and second corrugated sheets being devoid of structure therebetween above said planar interstitial sheet.

8. The structural cross flow media block of claim 7 wherein said tower is constructed of a plurality of first corrugated sheets and a corresponding plurality of second corrugated sheets, each pair of said corrugated sheets having one of said planar interstitial sheets positioned between said corrugated sheets.

9. The structural cross flow media block of claim 8 wherein said media block includes a bottom surface and a top surface, said first and second corrugated sheets and said planar interstitial sheet having a common terminus edge along said bottom surface, said planar interstitial sheet terminating along an upper edge spaced below said top surface.

10. The structural cross flow media block of claim 8 wherein said media block includes a bottom surface and a top surface, each of said first and second corrugated sheets and said planar interstitial sheet terminating along an upper edge spaced above said bottom surface, said planar interstitial sheet including a lower edge spaced above said bottom surface.

11. The structural cross flow media block of claim 8 wherein said planar interstitial sheet traps a gas in the first and second flutes corresponding to a single point of input of said gas into said media block until said gas passes said upper edge of said interstitial sheet, said gas dispersing into intersecting first and second flutes above said upper edge of said interstitial sheet.

12. A structural cross flow media block having a bottom surface and a top surface, consisting essentially of:

a plurality of first corrugated sheets having a first height dimension and being formed with first flutes extending at a first orientation to a vertical alignment;

a plurality of second corrugated sheets having said first height dimension and being formed with second flutes extending at a second orientation to a vertical alignment, said second orientation being different from said first orientation, said first and said second corrugated sheets being positioned in an alternating configuration;

a plurality of planar interstitial sheets having a second height dimension smaller than said first height dimension such that each said interstitial sheet terminates at an upper edge spaced below said top surface with one of said planar interstitial sheets being positioned at only one end of said cross flow media block and after each said corrugated sheet such that said first flutes of any of said first corrugated sheet do not intersect with said second flutes of the adjacent second corrugated sheet along each said planar interstitial sheet, said first and second flutes of adjacent corrugated sheets intersecting above each said upper edge.

13. The structural cross flow media block of claim 12 wherein said first and second corrugated sheets and said planar interstitial sheets having a common terminus edge along said bottom surface.

14. The structural cross flow media block of claim 13 wherein said planar interstitial sheet traps a gas in the first and second flutes corresponding to a single line of input of said gas into said media block until said gas passes said upper edge of said interstitial sheet, said gas dispersing into intersecting first and second flutes above said upper edge of said interstitial sheet.

* * * * *